US010717922B2

(12) United States Patent
Al-Dhafeeri et al.

(10) Patent No.: US 10,717,922 B2
(45) Date of Patent: Jul. 21, 2020

(54) COMPOSITION AND METHOD FOR STIMULATION OF OIL PRODUCTION IN SANDSTONE FORMATIONS

(76) Inventors: Abdullah Al-Dhafeeri, Al-Yarmok (SA); Nader M. Obeid, Rabwah (SA)

( * ) Notice: Subject to any disclaimer, the term of this patent is extended or adjusted under 35 U.S.C. 154(b) by 118 days.

(21) Appl. No.: 12/454,246

(22) Filed: May 13, 2009

(65) Prior Publication Data
US 2010/0288499 A1 Nov. 18, 2010

(51) Int. Cl.
C09K 8/60 (2006.01)
C09K 8/72 (2006.01)
C09K 8/58 (2006.01)
E21B 43/25 (2006.01)

(52) U.S. Cl.
CPC .......... *C09K 8/60* (2013.01); *C09K 8/58* (2013.01); *C09K 8/72* (2013.01); *E21B 43/25* (2013.01)

(58) Field of Classification Search
None
See application file for complete search history.

(56) References Cited

U.S. PATENT DOCUMENTS

| 4,487,265 A * | 12/1984 | Watanabe .................. 166/307 |
| 4,633,949 A | 1/1987 | Crowe |
| 5,260,268 A | 11/1993 | Forsberg et al. |
| 5,783,527 A | 7/1998 | Dobson, Jr. et al. |
| 5,876,517 A * | 3/1999 | Jeannier .................. 148/264 |
| 5,961,736 A * | 10/1999 | Borah et al. ................. 134/26 |
| 6,289,989 B1 | 9/2001 | Mueller et al. |
| 6,994,173 B2 | 2/2006 | West |
| 7,021,377 B2 | 4/2006 | Todd et al. |
| 7,119,050 B2 * | 10/2006 | Chang et al. ................. 507/244 |
| 7,192,908 B2 * | 3/2007 | Frenier et al. ................ 507/241 |
| 7,427,584 B2 * | 9/2008 | Frenier et al. ................ 507/241 |
| 7,753,123 B2 * | 7/2010 | Fuller ........................ 166/307 |
| 2003/0109411 A1 * | 6/2003 | Kilkenny et al. ............ 510/438 |
| 2005/0042181 A1 * | 2/2005 | Gotou et al. ................... 424/46 |
| 2006/0041028 A1 * | 2/2006 | Crews .................. B01D 17/047 516/135 |
| 2006/0148657 A1 | 7/2006 | Santra et al. |

FOREIGN PATENT DOCUMENTS

GB 2 412 391 A 9/2005

OTHER PUBLICATIONS

Nasr-El-Din et al.; New methodology to effectively stimulate water disposal wells drilled in acid sensitive sandstone formations in Saudi Arabia; *Society of Petroleum Engineers 93502* (2005) pp. 1-13.
Hashem et al. An experience in acidizing sandstone reservoirs: A scientific approach; *SPE 56528* (1999) pp. 1-15.
Taylor et al. Flowback analysis of acid stimulation of seawater injection wells: Case histories; *SPE 58736* (2000) pp. 1-9.
Thomas et al. The impact of HCl to HF Ratio on hydrated silica formation during the acidizing of a high temperature sandstone gas reservoir in Saudi Arabia; SPE 77370 (2002) pp. 1-17.
Rae et al. Matrix acid stimulation—a review of the state-of-the-art; *SPE 82260* (2003); pp. 1-11.

* cited by examiner

*Primary Examiner* — Andrew Sue-Ako
(74) *Attorney, Agent, or Firm* — D'Hue Law LLC; Cedric A. D'Hue

(57) ABSTRACT

A method and a composition for stimulating oil production from wells which have ceased production by pumping in a mixture of gluconic, oxalic and citric acids, isopropanol, ethylene glycol and sodium citrate between pre-flush and over-flush intervals, which composition and method does not include the use of hydrochloric acid or hydrofluoric acid.

17 Claims, No Drawings

COMPOSITION AND METHOD FOR STIMULATION OF OIL PRODUCTION IN SANDSTONE FORMATIONS

BACKGROUND OF THE INVENTION

This invention relates to a method and a composition to effectively stimulate oil production from a subterranean hydrocarbon-bearing rock formation penetrated by a wellbore and, more particularly, to a composition and method to acidize a hydrocarbon-bearing sandstone formation to stimulate production without the use of either hydrochloric or hydrofluoric acids.

DESCRIPTION OF THE PRIOR ART

It is well known in petroleum production that the use of acid treatments to stimulate oil flow from a subterranean sandstone reservoir is a comparatively difficult and complex task when compared to the relative ease of stimulating oil flow from a carbonate reservoir. While the treatment of a carbonate reservoir with hydrochloric acid and/or hydrofluoric acid readily forms water-soluble products, such as calcium chloride in water, while sandstone acidizing with "mud acid" (HCl/HF) generates several reaction products which may precipitate and cause formation damage.

Formation damage occurring in oil wells in sandstone-based fields results from a combination of naturally occurring factors due to reservoir fluids, as well as factors due to operations, such as drilling, workovers, previous acid stimulation treatments or during well production. The resulting damage can include fines migration, scale formation, deposition of paraffins, asphaltenes, or a combination of both organic and inorganic deposition. In addition, the drilling fluid can also be a source of formation damage when it invades a sandstone reservoir. Still other causes of formation damage may result from plugging due to particles within the injected fluid, wetability alteration, and the dispersion or the swelling of clays, emulsions, sludges, bacterial products and water-block.

An acid wash or matrix acidizing is typically used to remove the "skin effect" near the well bore and is introduced at a pressure below the formation's fracture pressure. Furthermore, the use of conventional acid systems, such as HCl and HF acids, causes the production of sand since it dissolves the cementitious portion beneath the quartz and silica particles.

It is an object of the present invention to provide a composition and method to enhance the permeability of a hydrocarbon-bearing sandstone formation to increase oil production therefrom.

It is another object of the present invention to remove formation damage in off-shore sandstone reservoirs by removing calcium carbonate particles, iron precipitates and dispersed or swollen clays from the vicinity of the wellbore.

It is still another object of the present invention to provide a method for introducing a stimulation fluid into a sandstone formation effectively and at a low cost.

SUMMARY OF THE INVENTION

A stimulation fluid has been found which avoids the need for using hydrochloric or hydrofluoric acids, and which has been used successfully to stimulate oil production in sandstone formations, from what had been considered to be dead wells or low production wells. The newly discovered stimulation fluid and its use both serves to improve permeability by removing formation damage due to calcium carbonate chips that are used as a "killing fluid" in drilling and work-over operations and to improve the oil production rate from a sandstone reservoir.

The composition of the present invention also has the capability of retaining iron and calcium in solution, when compared with prior art stimulating compositions that contain conventional strong acids, such as hydrochloric and hydrofluoric acids, which cause the iron and calcium to precipitate.

The composition of the present invention, which includes both organic and inorganic chemicals, is a mixture of gluconic acid, oxalic acid, citric acid, isopropanol, ethylene glycol and sodium citrate.

The composition of the present invention may include a hydrogen sulfide scavenger and a corrosion inhibitor.

The stimulative mixture of the present invention has been successfully used to enhance permeability and increase oil production when delivered to the wellbore of a sandstone formation in accordance with the method of the present invention. The method is a single stage process involving three intervals or steps.

In the first interval or step, a solvent pre-flush consisting of a mutual solvent and water is pumped into the wellbore.

In the second interval or step, the composition of the present invention is pumped into the wellbore and acts to dissolve and remove precipitates in the wellbore region and thus reestablish permeability and improve production.

In the third interval or step, a solvent overflush comprising a mutual solvent and diesel fuel is pumped into the wellbore to displace the composition of the present invention and the resulting reaction products.

DETAILED DESCRIPTION OF THE INVENTION

As a result of experimentation it has been determined that to achieve optimum results, the quantities of the chemicals in the composition of the present invention are preferably employed within certain ranges and that the composition must be introduced in accordance with a method that includes the specific sequence of intervals or steps described above generally, and in more detail below.

The chemicals and the quantities that are to be employed in accordance with a preferred embodiment of the present invention are as follows:

Gluconic Acid: 10-50%, by weight;
Oxalic Acid: 0-0.5%, by weight;
Citric Acid: 10-50%, by weight;
Isopropanol: 100-600 ppm, by weight;
Ethylene Glycol: 10-100 ppm, by weight; and
Sodium Citrate: 100-600 ppm, by weight.

The foregoing composition has been found to provide a highly effective stimulation fluid while simultaneously avoiding damage which would compromise the integrity of a subterranean sandstone formation.

The method of the invention involves carrying out the stimulation in a single-stage using the "bull-heading" technique with three pumping intervals, namely, a pre-flush interval or step, a main chemical introduction step or interval, and an over-flush interval or step, while avoiding any lengthy soaking time between each of these three (3) pumping intervals. This is in contrast to the well-known three-stage treatment methods which are employed conventionally with soaking time after each of the stages when acidizing carbonate formations with HCL, HF, or both. The single-stage treatment in accordance with the present invention results in effectively stimulating the sandstone reservoir to increase its permeability and to revive so-called dead wells by lowering the treatment cost and significantly shortening the required treatment times.

EXAMPLE 1

The single stage method of the present invention includes three separate intervals which are:

Interval 1—Solvent Preflush

The main objective of the solvent preflush interval (the "first interval") is to clean the formation by dissolving/dispersing heavy hydrocarbons and breaking emulsions in the wellbore region. An ancillary purpose is to water-wet the formation using a mutual solvent surfactant. This step is employed to enhance the contact of the composition of the present invention, which is pumped in the second interval or step, with carbonate and iron precipitates that are present near the wellbore area.

In the pre-flush interval, water and 1-5 vol % of a mutual solvent, such as ethylene glycol is pumped into the wellbore, preferably using the bull-heading technique, and allowed to soak for about 0.5 hrs. The bull-heading technique is a known and field-proven placement method during chemical treatment. It is also considered to be cost effective when compared to the coil tubing technique. The utilization of bull-heading often results in improving the chemical placement with no mechanical isolation required to treat zones.

The mutual solvent serves to remove any organic residue and better enables the stimulating composition to react with the damaging minerals. Other mutual solvents which can be used to advantage are oxyalkylated alcohols and aromatic alcohols.

Interval 2—Treatment Interval Using the Composition of the Present Invention

The main objective of this treatment interval (the "second interval") is the use of the composition of the present invention to dissolve and remove calcium and iron precipitates in the wellbore region. It also has the properties to dissolve filter cake, starch and clays and to remove downhole bacteria.

The volume of the composition of the present invention which is pumped into the wellbore can range from 1-10 gal/ft (open-hole completion) and 10-20 gal/ft of perforations (if a perforated casing completion type is used).

The static temperature at the bottom of the wellbore may be about 180° F.

Interval 3—Over-Flush

The objective of this interval (the "third interval") is to provide an over-flush fluid to displace the chemical composition of the second interval from the vicinity of the wellbore. It consists of pumping in diesel fuel and 1-5% of a mutual solvent such as ethylene glycol. Other mutual solvents which can be utilized are, for example, oxyalkylated alcohols and aromatic alcohols.

It thus can be seen that the objects set forth are achieved and since certain changes may be made in carrying out the above process and in the composition without departing from the scope of the invention as defined by the claims that follows, it is intended that all matter in the foregoing description shall be interpreted as illustrative and not as limiting.

What is claimed is:

1. A composition for stimulating oil production from a subterranean hydrocarbon formation penetrated by a wellbore, consisting of: gluconic acid, citric acid, oxalic acid, isopropanol, ethylene glycol, and sodium citrate, wherein the composition is capable of being delivered to a wellbore.

2. The composition according to claim 1, wherein the composition includes 10 to 50%, by weight of gluconic acid, 10 to 50% by weight of citric acid, 0 to 0.5%, by weight of oxalic acid, 10 to 600 ppm of isopropanol, 10 to 100 ppm of ethylene glycol and 10-600 ppm of sodium citrate.

3. A system for stimulating oil production from a subterranean hydrocarbon formation penetrated by a wellbore, which comprises:
   a composition consisting of gluconic acid, citric acid. oxalic acid, isopropanol, ethylene glycol, and sodium citrate, wherein the composition is delivered to the wellbore.

4. The system according to claim 3, wherein the composition flushes the formation by dissolving and removing one of the group consisting of calcium precipitates, iron precipitates, dispersed clays, swollen clays, filter cake, starch, bacteria and any combinations thereof.

5. A composition for flushing a subterranean hydrocarbon formation penetrated by a wellbore consisting of: gluconic acid, citric acid, oxalic acid, isopropanol, ethylene glycol, and sodium citrate.

6. The composition according to claim 5, wherein the composition includes 10 to 50%, by weight of gluconic acid, 10 to 50% by weight of citric acid, 0 to 0.5%, by weight of oxalic acid. 10 to 600 ppm of isopropanol, 10 to 100 ppm of ethylene glycol and 10-600 ppm of sodium citrate.

7. A method of stimulating oil production from a subterranean hydrocarbon formation penetrated by a wellbore, which comprises the steps of:
   (a) pre-flushing, the formation by pumping a mixture of water and a mutual solvent into the wellbore to dissolve hydrocarbons and break emulsions in the vicinity of the wellbore and to wet the formation;
   (b) flushing the formation by pumping into the wellbore a hydrocarbon stimulating composition which includes gluconic acid, citric acid, oxalic acid, isopropanol, ethylene glycol and sodium citrate, with the proviso that the composition does not include hydrochloric acid or hydrofluoric acid; and
   over-flushing the formation with a mixture of diesel oil and a mutual solvent to substantially displace the hydrocarbon stimulating composition of step b) from the wellbore.

8. The method according to claim 7, wherein the hydrocarbon-bearing formation is sandstone.

9. The method according to claim 7, wherein the hydrocarbon stimulating composition includes 10 to 50%, by weight of gluconic acid, 10 to 50%, by weight of citric acid. 0 to 0.5%, by weight of oxalic, acid, 10 to 600 ppm of isopropanol, 10 to 100 ppm of ethylene glycol and 10-600 ppm of sodium citrate.

10. The method according to claim 7, wherein the mutual solvent during the pre-flushing of step (a) and the over-flushing of step (c) are selected from the group consisting of ethylene glycol, oxyalkylated alcohols and aromatic alcohols.

11. The method according to claim 10, wherein the mutual solvent is from about 1 to 5 vol % of ethylene glycol.

12. The method of claim 7, wherein the volume of the hydrocarbon stimulating composition of step (b) is from 1-10 gal/ft of open-hole completion.

13. The method according to claim 7, wherein the hydrocarbon stimulating composition of step (b) includes a hydrogen sulfide scavenger and a corrosion inhibitor.

14. The method according to claim 12, wherein the static temperature at the bottom of the wellbore is about 180° F.

15. The method according to claim 7, wherein the hydrocarbon stimulating composition of step (b) dissolves and removes calcium and iron precipitates in the wellbore region.

16. The method according to claim 7, wherein the hydrocarbon stimulating composition of step (b) further dissolves filter cake, starch and clays and removes downhole bacteria.

17. The method of claim 7, wherein the volume of the hydrocarbon stimulating composition of step (b) is from 10-20 gal/ft of perforated casing completion.

* * * * *